(12) United States Patent
Sailhan et al.

(10) Patent No.: US 8,321,528 B2
(45) Date of Patent: Nov. 27, 2012

(54) METHOD OF PROCESSING EVENT NOTIFICATIONS AND EVENT SUBSCRIPTIONS

(75) Inventors: Francoise Sailhan, Athlone (IE); Javier Baliosian, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/665,034

(22) PCT Filed: Jun. 29, 2007

(86) PCT No.: PCT/EP2007/056607
§ 371 (c)(1),
(2), (4) Date: Jul. 15, 2010

(87) PCT Pub. No.: WO2009/003514
PCT Pub. Date: Jan. 8, 2009

(65) Prior Publication Data
US 2010/0281150 A1    Nov. 4, 2010

(51) Int. Cl.
*G06F 15/16* (2006.01)
(52) U.S. Cl. .................................................. 709/217
(58) Field of Classification Search .................. 709/217
See application file for complete search history.

(56) References Cited

U.S. PATENT DOCUMENTS

| | | | |
|---|---|---|---|
| 6,298,378 B1 | 10/2001 | Angal et al. | |
| 6,763,383 B1* | 7/2004 | Evison et al. | 709/224 |
| 7,607,138 B2* | 10/2009 | Donovan et al. | 719/318 |
| 2002/0143755 A1* | 10/2002 | Wynblatt et al. | 707/3 |
| 2002/0156879 A1* | 10/2002 | Delany et al. | 709/223 |
| 2003/0058096 A1 | 3/2003 | Shteyn | |
| 2005/0108368 A1* | 5/2005 | Mohan et al. | 709/220 |
| 2006/0112178 A1* | 5/2006 | Van Vleet et al. | 709/224 |
| 2006/0271662 A1* | 11/2006 | Fritsch et al. | 709/223 |
| 2007/0027978 A1* | 2/2007 | Burkman et al. | 709/224 |
| 2008/0270628 A1* | 10/2008 | Nekovee et al. | 709/247 |
| 2011/0196940 A1* | 8/2011 | Martinez et al. | 709/217 |

OTHER PUBLICATIONS

Jerzak, Z. et al., Bloom filter based routing for content-based publish/subscribe, 2008, ACM, Proceedings of the second international conference on Distributed event-based systems, pp. 71-81.*

Triantafillou, P. et al., Subscription summaries for scalability and efficiency in publish/subscribe systems, 2002, IEEE, Proceedings of the 22nd International Conference on Distributed Computing Systems Workshops, pp. 619-624.*

PCT International Search Report, dated Sep. 4, 2007, in connection with International Application No. PCT/EP2007/056607.

(Continued)

*Primary Examiner* — Alicia Baturay
(74) *Attorney, Agent, or Firm* — Potomac Patent Group PLLC

(57) ABSTRACT

A method of processing event notifications and event subscriptions in a telecommunications or data network comprising a plurality of nodes, wherein an individual node performs the steps of maintaining a first repository for storing a set of event subscriptions encoded in a first summary and maintaining a second repository for storing the set of event subscriptions. The node encodes a received event notification into a second summary and then checks if the received event notification is a member of the set by comparing the first summary and the second summary. If the event notification is not a member of the set said notification is discarded.

9 Claims, 5 Drawing Sheets

OTHER PUBLICATIONS

Vogels, W. et al. "A collaborative infrastructure for scalable and robust news delivery" Distributed Computing Systems Workshops, 2002. Proceedings 22nd International Conference on Jul. 2-5, 2002, Piscataway, NJ, USA, IEEE, Jul. 2, 2002, pp. 655-659, XP010601595, ISBN: 0-7695-1588-6.

Brode, A. et al. "Network Applications of Bloom Filters: a Survey" Internet Citation, [Online] May 2, 2003, XP002355223. Retrieved from the Internet: URL: Harvard University, USA, presented at Allerton Conference 2002 (see EP1583281) www.eecs.harvard.edu/{michaelm/CS222/Bloom Survey.pdf> [retrieved Nov. 21, 2005].

* cited by examiner

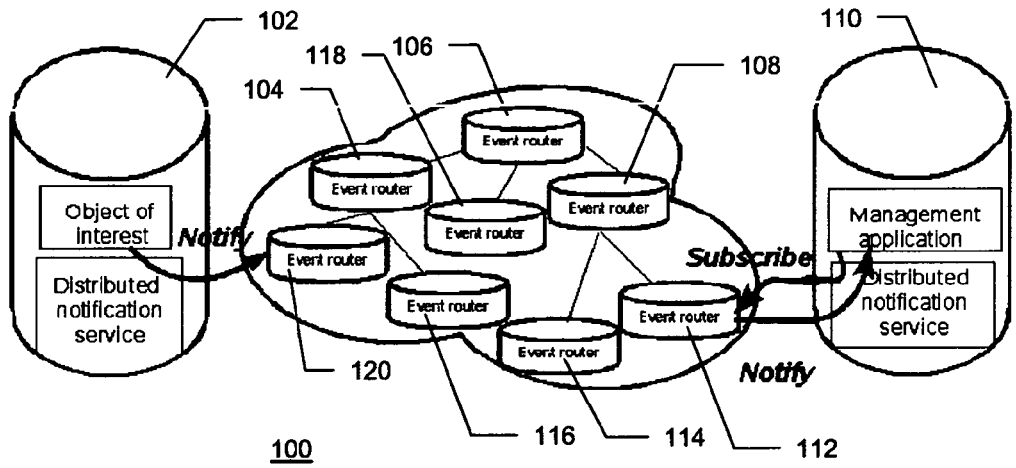

*FIG. 1*

| Type | Key | Value |
|---|---|---|
| String | application | = org.celtic.madeira.networkMonitoring |
| String | level | = warning |
| Time | date | = Mar 4 12:01:01 MST 2006 |
| String | function | = Directory service stopped |

*FIG. 2*

Subscription 1

| Operator | Type | Key | Constraint |
|---|---|---|---|
| AND | String | application | = org.celtic.madeira.networkMonitoring |
|  | String | level | = severe |

Subscription 2

| Operator | Type | Key | Constraint |
|---|---|---|---|
| AND | String | application | = org.celtic.madeira.networkMonitoring |
|  | String | level | = warning |

*FIG. 3*

METHOD OF PROCESSING EVENT NOTIFICATIONS AND EVENT SUBSCRIPTIONS

TECHNICAL FIELD

The present invention relates to telecommunications and data networks, in general, and in particular to handling event notifications and event subscriptions in telecommunications and data networks.

BACKGROUND

Event notification constitutes a cornerstone of monitoring systems since it allows operator to capture and react to events in the network. Note that an event constitutes a significant occurrence in the system and is reported by an event notification message, also simply called notification. This notification contains information that characterizes the event itself and the context in which the event occurs. In a telecom network, an event producer is typically a managed agent and may be considered equivalent to a Network Elements (NEs). Managers typically represent the event consumers and have different demand on their agents (e.g., managers monitor agent to gather statistic related to the performance). The management entities (managers and agents) are distributed in the network.

The publish/subscribe paradigm constitutes a central enabler of event notification since it allows any NE (consumer) to expresses its monitoring demands to producers during a subscription process. As a result of this subscription process, event producers transfer to consumers the description of any event that has been triggered locally.

One of the main challenges that have to face an event system in general, and publish/subscribe event system in particular, is the load related to event notification which is put on the network elements and on Operations Support Systems (OSS). To resolve this problem, a variety of event filtering, aggregating and correlating schemes have been proposed.

In a publish/subscribe system, event filtering consists of matching an event notification against each subscription stored on the device so as to redirect this notification towards the interested consumers. Practically, the matching of an event notification against a subscription consists of verifying that the notification meets each criterion (also called constraint) defined in that subscription. If it is not the case, the event notification is not processed further, improving the system performance.

Event filtering is a costly mechanism in terms of memory usage and computation usage, since it requires going through each subscription and verifying if the attributes of the event notification meet each constraint defined in the subscription. This means that the overload increases proportionally to the number of events occurring in the network. To understand the problem with existing solutions, one has to consider two factors. The first being the cost (in term of delay and resource usage) associated with filtering a notification in which no consumer is interested is equivalent to the cost necessary to identify some interested consumers. The second factor is the amount of events raised in the managed network. This amount is often out of proportion comparing to the number of events that are relevant for one of several consumers. As a result, the majority of events that are processed during the filtering process are not relevant. Existing solutions do not provide any mechanism to identify those not-relevant events in an early stage so as to prevent from performing a costly filtering of those events and reduce the unnecessary resource usage on some nodes (network elements), which might be resource constrained, as it is the case for Radio Base Station (RBS).

SUMMARY

It is the object of the present invention to obviate at least some of the above disadvantages and provide an improved method of processing event notifications and event subscriptions that allows for a fast filtering of event notifications.

Accordingly, the invention seeks to preferably mitigate, alleviate or eliminate one or more of the disadvantages mentioned above singly or in any combination.

The present invention uses the concept of pre-filtering event notifications. This pre-filtering constitutes a coarse-grained filtering, which aims to determine the events that are not relevant (i.e., the events to which no consumer have subscribed to) with the intended purpose of discarding them in an early stage. In short, all the subscriptions are encoded in a summary. It allows matching easily a notification against the subscriptions summary to identify the irrelevant events. This process is less costly than a full filtering process and thus reduces the load put on Network Elements.

According to a first aspect of the present invention there is provided a method of processing event notifications and event subscriptions in a telecommunications or data network comprising a plurality of nodes. The method, when performed on an individual node, comprises maintaining a first repository for storing a first summary in which a set of event subscriptions is encoded and maintaining a second repository for storing the set of event subscriptions. When an event notification is received said node encodes said event notification into a second summary. The method further comprises checking if the received event notification is a member of the set by comparing the first summary and the second summary. If the received event notification is not a member of the set said event notification is discarded.

Preferably the set of event subscriptions is encoded in a first Bloom filter and the received event notification is encoded in a second Bloom filter.

Once a new event subscription is received said subscription is added to the first summary.

If the received event notification is a member of the set the event notification attributes are checked against subscriptions constraints and if a match is found a subscriber of the matching event subscription is identified and the event notification is routed to said subscriber.

Said second repository is used for storing a set of event subscriptions, wherein the subscriptions in the set are, preferably, indexed. In order to generate the index and to use said index the method further comprises hashing constraints of a subscription and generating an index based on said hashed subscription constraints. An identity of a node that forwarded said subscription is linked with said subscription and stored in said second repository. Once an event notification is received it is hashed and its index is generated. In the next step it is checked if a subscription matching said notification is recorded in said second repository. In order to reduce the number of check operations the received event notification is checked only against subscriptions with indexes that match said notification's index. Finally, if a subscription matching the received notification is found the subscriber node linked with said subscription is identified. The identification is carried out based on the association stored in the second repository. Once the subscriber node is identified the event notification is routed to said subscriber node.

According to a second aspect of the present invention there is provided a telecommunications or data network comprising a plurality of nodes. An individual node of said network is adapted to maintain a first repository, which is used for storing a first summary in which a set of event subscriptions is encoded. The node is also adapted to maintain a second repository for storing the set of event subscriptions. Said node is further adapted to encode a received event notification into a second summary and to check if the received event notification is a member of the set by comparing the first summary and the second summary. If the received event notification is not a member of the set said notification is discarded.

According to a third aspect of the present invention there is provided a node for telecommunications or data network. The node is adapted to maintain a first repository, which is used for storing a first summary in which a set of event subscriptions is encoded. The node is also adapted to maintain a second repository for storing the set of event subscriptions. Said node is further adapted to encode a received event notification into a second summary and to check if the received event notification is a member of the set by comparing the first summary and the second summary. If the received event notification is not a member of the set said notification is discarded.

Further features of the present invention are as claimed in the dependent claims.

The main advantage of this invention is that the pre-filtering reduces the load put on the NEs that filter the event notifications. More precisely, the introduced summary based on Bloom filter encompasses the set of received event subscriptions and hence prevents from carrying out a complete and thereby resource-consuming matching of a notification against the subscription repository. It is important because there are notifications in which no consumer is interested and full processing of them would waste resources of the system. Indeed, a large number of events are triggered by network elements, whereas only part of them is relevant to network operator. Additionally, the proposed index based filtering scheme, further reduces the load on event routers while the selective publish/subscribe based forwarding scheme reduces the traffic generated by the dissemination of events. This index filtering scheme reduces significantly the delay when the incoming notifications are matched against subscriptions.

BRIEF DESCRIPTION OF THE DRAWINGS

The present invention will be understood and appreciated more fully from the following detailed description taken in conjunction with the drawings in which:

FIG. 1 is a diagram illustrating a telecommunications network in one embodiment of the present invention;

FIG. 2 illustrates event notification generated by an event producer in one embodiment of the present invention;

FIG. 3 illustrates event subscriptions generated by an event consumer in one embodiment of the present invention;

DETAILED DESCRIPTION

Figure 4:
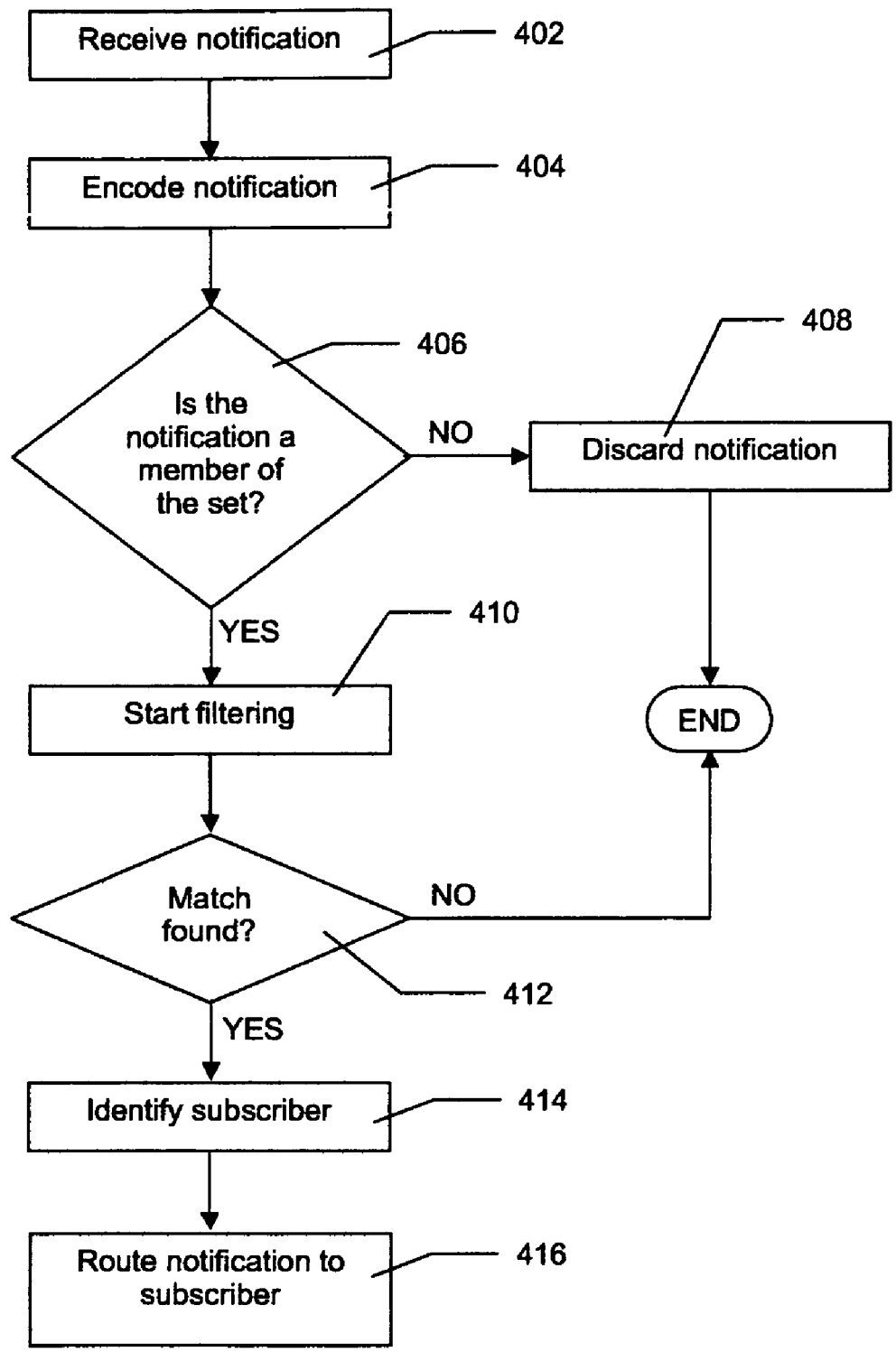
FIG. 4 is a diagram illustrating a method of processing event notifications and event subscriptions in one embodiment of the present invention.

The term event router herein below refers to a network element, or network node, which aims to forward event subscriptions and event notifications that were issued by an event subscriber (or respectively an event producer). The term event router also refers to an event subscriber or an event producer. Examples of event routers include radio base stations (RBS), Mobile switching centres (MSC), base station controllers (BSC), Radio Network Controllers (RNC), IP Routers, and Gateway nodes (MGW).

An event notification 200 (also simply called notification), illustrated in FIG. 2, is composed of a set of typed attributes 202-208. Each attribute consists of a key-value pair. An attribute type belongs to a predefined set of primitive types e.g. string, double, integer or date, 208. FIG. 2 provides an example of a notification issued by a network monitoring application. This notification informs about a directory service being stopped, 208. Three remaining attributes, 202-206 of this event notification relate to application, 202, that produced this event, level (or severity), 204, of the event and the date, 206, when the event occurred.

An event subscription 302, 304 (also simply called subscription) is illustrated in FIG. 3. The subscription refers to a set of $n_{fs}$ filters $(f_1, \ldots, f_i, \ldots, f_{nfs})$ where each filter $f_i$ designates the interest of a consumer for a particular event. A filter $f_i$ is a boolean expression that embodies a conjunction of constraints on the values of notification attributes. Each of those constraints is characterised by a type, a key, predicate operator=and a value. FIG. 3 provides two distinct subscriptions (subscription 1, 302 and subscription 2, 304), each including one filter, which designates the interest for events (in this case alarms) produced by a certain network monitoring application 306 and characterised in one case by a severe level 308 and in the other by a warning level 310.

An event (or to be more precise an event notification) matches a subscription filter if all the constraints specified in the filter are satisfied by the event notification. For instance, the event notification 200 displayed in FIG. 2 matches Subscription 2, 304, but not Subscription 1, 302. This is due to the fact that the constraint defined on the severity level of the alarm is only satisfied by Subscription 2.

In one embodiment of the present invention an individual node 104 of the telecommunications or data network 100 maintains two repositories for storing event subscriptions. A first repository is for storing a set of event subscriptions encoded in a first summary, whereas a second repository is for storing the set of event subscriptions. The event subscriptions in the second repository are not encoded into a summary. They are stored as separate records; however in various embodiments the records may be stored in various formats. In one embodiment the second repository may contain records of event subscription as illustrated in FIG. 3 (i.e. data in string format). In another embodiment the strings may be converted to binary format.

In one embodiment the first repository and the second repository are two separate entities. In other embodiments the two repositories are two parts of the same data structure. In terms of hardware implementation, the two repositories may be stored in the same memory unit (e.g. disk, flash memory, etc) or in two separate memory units. There is a wide variety of possible implementations of these repositories, but they are not part of the invention.

A received event notification 402 is encoded 404 by the node into a second summary. This second summary is used to check if the received event notification meets the criteria of the event subscription (i.e. if the notification attributes are members of the summary representing the subscriptions constraints). In the process of checking 406 the first summary and the second summary are compared and event notifications, which are not members of the set, are discarded 408.

In order to pre-filter an incoming notification against the received subscriptions, a router relies on a subscription summary. In a preferred embodiment Bloom filters are used to represent the summary.

Bloom Filter

A Bloom filter is a memory-efficient way of representing a set in an array of bits with the purpose of testing whether or not an element is a member of the set. Formally, the main idea behind building a Bloom filter is based on calculating a vector v of m bits which represents the set of subscriptions. More precisely, a Bloom filter is a bit array of size m (or m×1 matrix) and includes k different hash functions. The initial value of all bits in the array is set to 0. The result of each of the hash functions is change of value of one of the bits in the array to 1, which means that each of these functions maps a key value to one of the m array positions. To add an event subscription to a filter (to the set's summary), the subscription's constraints (name and value, e.g. application org.celtic.madeira.networkMonitoring) is hashed with each of the k hash functions. Each hash function produces an array position that is set to 1. To add another subscription to the filter the array modified during the step of adding the previous element is used.

Figure 5:
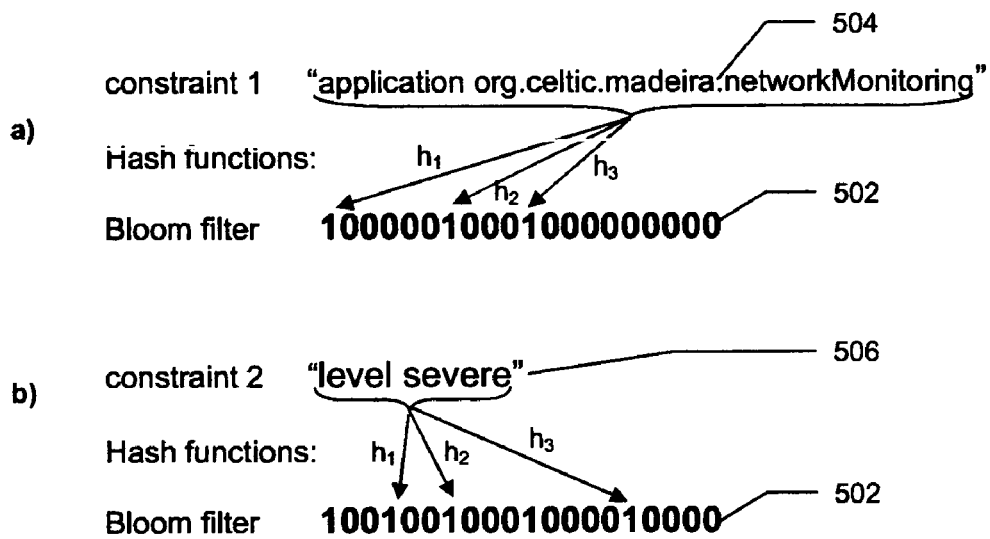
FIG. 5 illustrates the concept of a Bloom filter used in one embodiment of the present invention.
Figure 6:
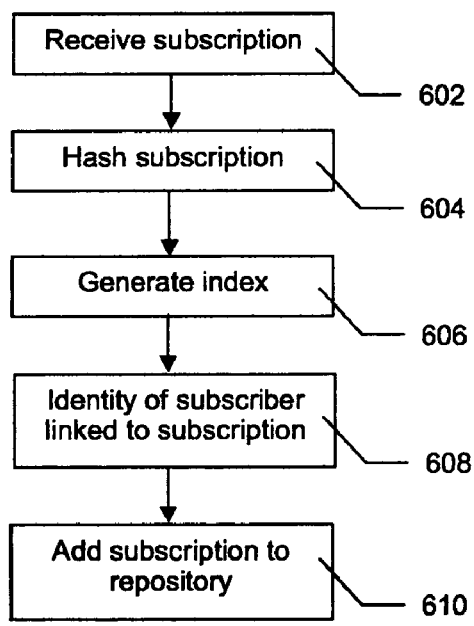
FIG. 6 is a diagram illustrating a method of processing event notifications and event subscriptions in one embodiment of the present invention.
Figure 7:
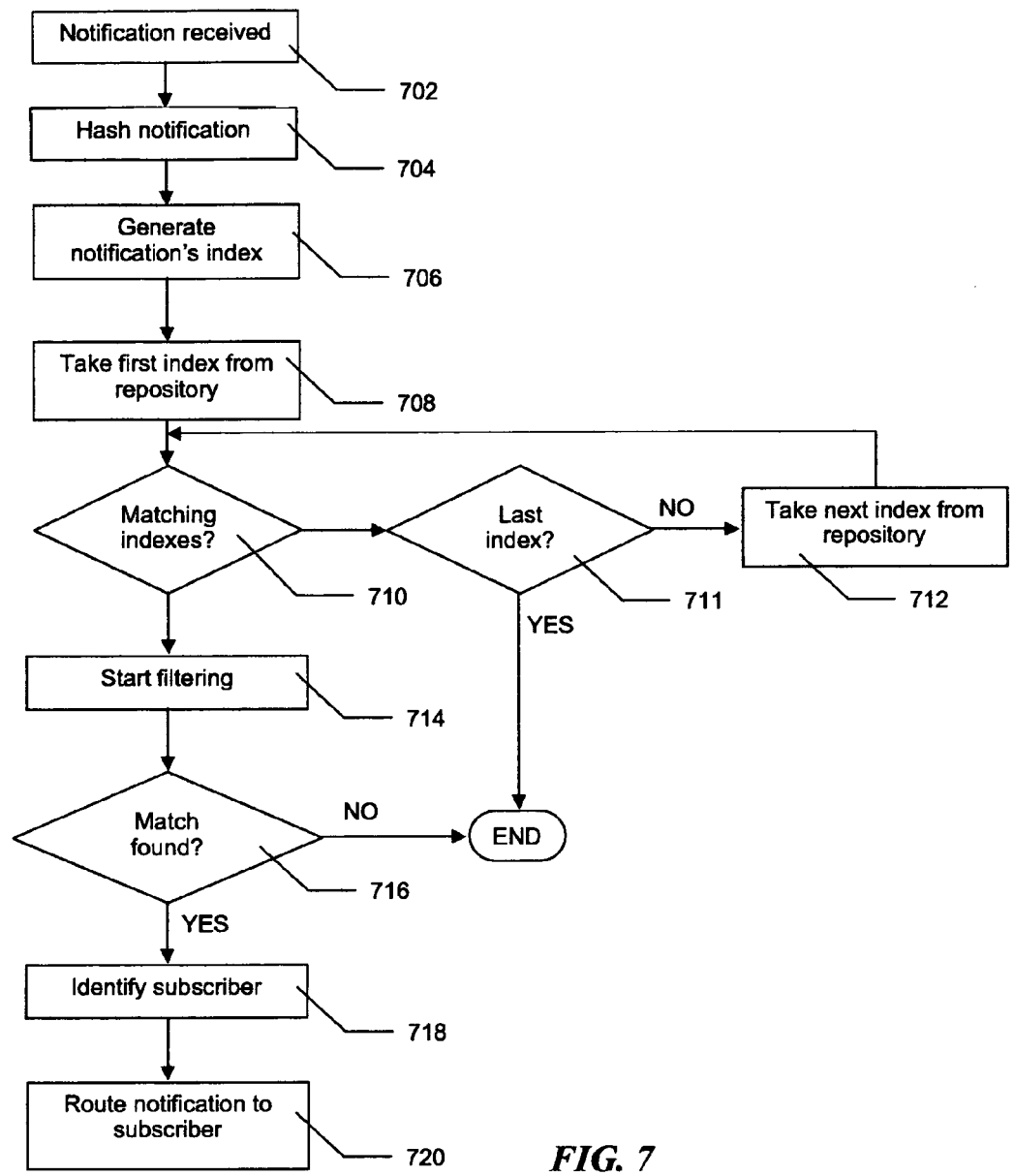
FIG. 7 is a diagram illustrating a method of processing event notifications and event subscriptions in one embodiment of the present invention.

With reference to FIG. 5 a) an example of operation of a Bloom filter is illustrated. In this example an array with twenty binary positions 502 is illustrated. Initially all positions have value "0". The Bloom filter in this embodiment has three hash functions $h_1$, $h_2$, $h_3$. Operation of the hash function $h_1$ on the constraint 1, 504, results in setting to "1" the value of array's poison no. 1. Operation of the hash function $h_2$ on the same constraint results in setting to "1" the value of the array's position no. 7 and for hash function $h_3$ the value of the array's position no. 11 is set to "1".

FIG. 5 b) illustrates adding a second constraint 506 to the set. Hash functions $h_1$, $h_2$, $h_3$ generate "1" in the array. It is, however, possible that for two or more elements to be added to the set the hash functions generate "1" in the same position in the array as it is illustrated in this example where hash function $h_2$ generated "1" once again in position no. 7. This may result in false positives. The reason why the attribute might not be in the set, i.e. a false positive, is because the same bits might have been set to "1" during the insertion of other elements.

Notification Pre-Matching

The resulting Bloom filter 502 is then used for pre-filtering an incoming notification. In order to determine whether a subscription filter matching an incoming notification, is summarised in a Bloom filter a process similar to adding a new subscription is used. To test whether an event notification's attribute is a member of the set represented by a Bloom filter, said attribute is hashed with each of the k hash functions to obtain k array positions. In this way a second Bloom filter, representing the incoming notification, is produced. If all "ones" of the second Bloom filter have "ones" on corresponding positions of the first Bloom filter representing the set of event subscriptions the attribute is in the set with a certain probability. In this case, a fine-grained and complete matching 410 of the notification against the second subscription repository, takes place. In this fine-grained filtering the incoming event notification's attributes are compared with the subscriptions' constraints stored in said second repository. Once a match is found the identity of a consumer that subscribed for this event notification is determined, 414, and the notification is routed to said subscriber 416.

If any of those positions with "one" in the second Bloom filter has bit value "zero" in the corresponding positions of the first Bloom filter 406 representing the set of event subscriptions, the attribute is not in the set. This indicates that no consumers were interested in this notification and none subscribed to it. In consequence the event notification is abandoned 408 and not processed any further. Based on the above, the delay and processing cost associated with filtering is kept to a minimum because the filtering is interrupted in an early stage (i.e., without requiring a complete matching of the notification against the subscription repository).

It is important to note that Bloom filters do not generate false negatives, which means that notification will not be accidentally discarded if there is a consumer interested in it. The relationship of the probability of false-positives on one hand and the filter size and the number of hash functions on the other hand is such that the higher the number of constraints that are summarised in a given bit array, the higher the probability of a false positive. Further, for a given number of constraints, one can determine a pair of array size and a number of hash functions, such that the resulting Bloom filter exhibits a reasonable low probability of false positives.

Although in the description of the embodiments of the invention Bloom filters are used as summaries representing the sets of event subscriptions and event notification it is envisaged that in alternative embodiments of this invention other summaries can be used instead of the Bloom filters. Examples of summaries that can be used in alternative embodiments of the present invention include data compression and search-oriented data structures such as b-trees.

In a preferred embodiment the set of subscriptions stored in the second repository is indexed 606. In operation, network node hashes 604 constraints of a received subscription 602 and generates an index 606 based on said hashed subscription constraints. In the next step the node links 608 an identity of the node that forwarded said subscription (consumer, subscriber node) with said subscription and stores this association in the second repository 610. This information allows routing the incoming event notification to a node that is interested in it. Once an event notification is received 702 the node hashes 704 it and generates said notification's index 706. In the next step the node checks if a subscription matching said notification is recorded in said second repository. In this preferred embodiment, however, the received notification is checked only against subscriptions with indexes that match said notification's index. To perform this filtering from the second repository a first index is taken 708 and compared with the index of the notification 710.

The term "first index" refers to an index that is associated with a subscription stored in the top row of a table of the second repository. In alternative embodiments the selection of the indexes for this filtering process may be different.

If the index of a subscription does not match the index of the event notification it is an indication that the subscription's constraints do not match the notification's attributes. In this case the next index is taken from the second repository 712 and is checked against the notifications index 710. This loop, 710-712 is repeated until a matching index is found.

In a preferred embodiment, when a pre-filtering using Bloom filters is used the loop 710-712 will find matching indexes. This is because the notifications for which no consumer subscribed are discarded and not processed. The exception from this rule is a false positive, which results in not discarding of non-subscribed notification. In an alternative embodiment, where no pre-filtering is used the loop 710-712 is repeated until a match is found or until all subscription indexes from the second repository are checked against the received notification's index.

By using indexing the event notification can be checked only against subscriptions with matching index and this significantly reduces the necessary computing. If a matching index is found 710 the filtering of the notification attributes through the subscriptions' constraints starts 714. If a subscription matching the received notification is found 716 the subscriber (node) linked with said subscription is identified 718 and the event notification is routed 720 to this subscriber.

Figure 8:
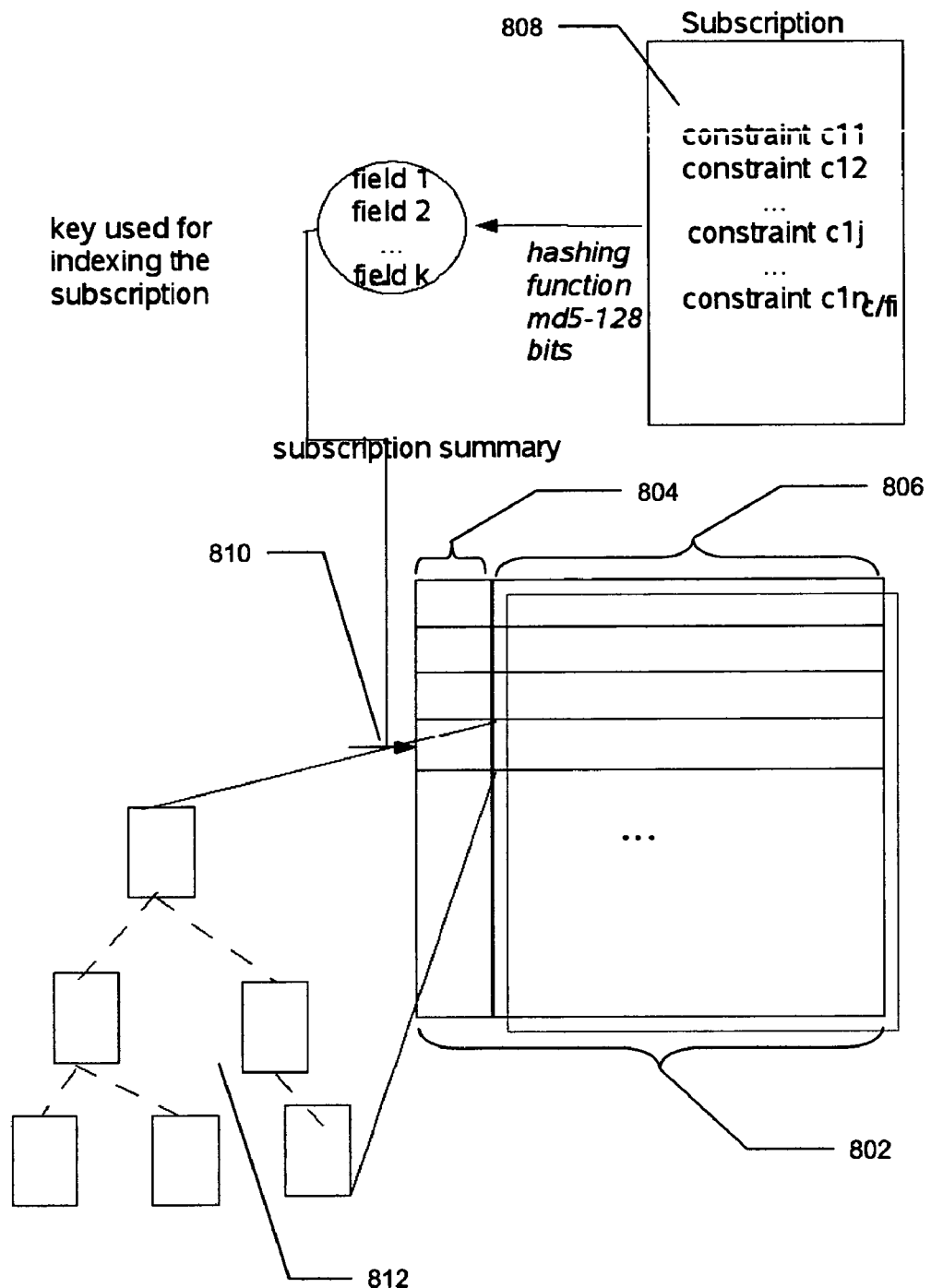
FIG. 8 is a diagram illustrating a method of processing event notifications and event subscriptions in one embodiment of the present invention.

With reference to FIG. 8 an embodiment of the invention that uses indexing of the second repository is further discussed. In order to match an incoming notification against subscriptions, each event router maintains the second repository 802 of the subscriptions made by the consumers. The second repository 802 includes all the subscriptions along with the identity of the subscribers. In a preferred embodiment, to ease the lookup of a subscription that matches an incoming notification, the second repository 802 comprises two parts, an index 804 and, associated with it, a slot 806 that includes a set of event subscriptions along with their subscriber identity. The second repository 802 is built based on the repeated insertion of the incoming subscriptions 808, which is performed in steps of hashing of the incoming subscription, indexing of this subscription based on the result of that hashing, and finally the recording of the subscription.

Formally, hashing a subscription s lies in hashing successively each constraint $C_{ij}$ contained in each filter which constitutes the subscription (with i belonging to $[1, n_{f/s}]$ and j belonging to $[1, n_{c/fi}]$, where $n_{f/s}$ identifies the number of filters included in the subscription and $n_{c/fi}$ the number of constraints in $f_i$). All the constraints $(C_{11}, C_{12}, \ldots, c_{nc/fi})$ illustrated in FIG. 8, which are included in the unique filter constituting subscription 808, are extracted. These constraint names, $c_{11}$.name, $c_{12}$.name, ..., $Cn_{c/fi}$.name are successively hashed with a hashing function h, which results in obtaining the values $h(c_{11}.name), h(c_{12}.name), \ldots, h(c_{nc/fi}.name)$. The result of this hashing is then used to generate an index of the event subscription.

A particular index designated by the key $\min(h(c_{ij}))$, is selected and used to store the subscription filter. In one embodiment the minimal function is used to generate the key. However, more sophisticated (and distributed) functions can also be used. This index designates the location 810 in the second repository 802 in which the incoming subscription 808 is stored.

The identity of the router that forwarded the related subscription filter (subscriber node) is linked with the subscription in the repository 806 to enable the event router to, upon reception of a notification, identify the neighbouring router(s) that are located in the direction of the ultimate consumer(s) towards which that notification should be propagated. The subscription is added in the slot of the repository designated by the selected index 810. In alternative embodiments this slot may be organized using different structure 812 (e.g., chained list, tree, or a forest of trees).

The repository described above is used for matching the incoming notifications against all the received subscriptions (filtering). This matching operation consists of hashing the notification to generate a key (index), and identify the position (slot) in the second repository 802 in which the subscription filter(s) that match this notification is stored. In order to hash an incoming notification, a node hashes the key of each notification attribute $a_1$ (1 belonging to $[1, n_a]$, with $n_a$ designating the number of attributes composing the incoming notification). In the repository, if the position designated by the index $\min(h(a_1))$ is not empty, then there exists a constraint that matches the attribute $a_1$. It means that potentially some subscription(s) stored in that position match the incoming notification. If it is the case, the set of subscribers associated with those subscription(s) is established and the incoming notification is forwarded to those subscribers.

In one embodiment as the hashing function h, used to generate the index, MD5 (Message-Digest algorithm 5) function is used. It is, however, within contemplation of the present invention that alternative hashing functions can also be used.

The invention claimed is:

1. A method of processing event notifications and event subscriptions in a telecommunications or data network comprising a plurality of nodes, wherein an individual node performs the steps of:
    maintaining a first repository for storing a set of event subscriptions encoded in a first summary;
    maintaining a second repository for storing the set of event subscriptions, wherein the set of event subscriptions is indexed;
    hashing constraints of an event subscription;
    generating an index based on said hashed event subscription constraints;
    linking an identity of a subscriber node that forwarded said event subscription with said event subscription and storing this association in the second repository;
    hashing a received event notification to generate said notification's index;
    checking if an event subscription matching said event notification is recorded in said second repository, wherein the received notification is checked only against event subscriptions with indexes that match said notification's index; and
    if an event subscription matching the received event notification is found a subscriber node linked with said event subscription is identified and the event notification is routed to said subscriber node.

2. The method according to claim 1, wherein the set of event subscriptions is encoded in a first Bloom filter and the received notification is encoded in a second Bloom filter.

3. The method according to claim 1, wherein if a new subscription is received said subscription is added to the first summary.

4. A telecommunications or data network comprising a plurality of nodes, wherein an individual node is adapted to maintain a first repository for storing a set of event subscriptions encoded in a first summary; maintain a second repository for storing the set of event subscriptions, wherein the set of event subscriptions is indexed; and said node is further adapted to:
    hash constraints of an event subscription;
    generate an index based on said hashed event subscription constraints;
    link said event subscription with an identity of a subscriber node that forwarded said event subscription and to store the association in said second repository;
    hash a received event notification to generate said notification's index;
    check if an event subscription matching said event notification is recorded in said second repository, wherein the received event notification is checked only against event subscriptions with indexes that match said notification's index; and if an event subscription matching the received event notification is found said node is adapted to identify a subscriber node linked with said subscription and to route the event notification to said subscriber node.

5. The network according to claim 4 adapted to encode the set of event subscriptions in a first Bloom filter and the received notification in a second Bloom filter.

6. The network according to claim 4, wherein the node is adapted to add a received subscription to the first summary.

7. A node for telecommunications or data network adapted to maintain a first repository for storing a set of event subscriptions encoded in a first summary; maintain a second repository for storing the set of event subscriptions, wherein the set of event subscriptions is indexed, and said node is further adapted to:

hash constraints of an event subscription;

generate an index based on said hashed event subscription constraints;

link said event subscription with an identity of a subscriber node that forwarded said event subscription and to store the association in said second repository;

hash a received event notification to generate said notification's index;

check if an event subscription matching said event notification is recorded in said second repository, wherein the received event notification is checked only against event subscriptions with indexes that match said notification's index; and if an event subscription matching the received event notification is found said node is adapted to identify a subscriber node linked with said subscription and to route the event notification to said subscriber node.

8. The node according to claim 7 adapted to encode the set of event subscriptions in a first Bloom filter and the received notification in a second Bloom filter.

9. The node according to claim 7 adapted to add a received subscription to the first summary.

* * * * *